Patented Feb. 16, 1932

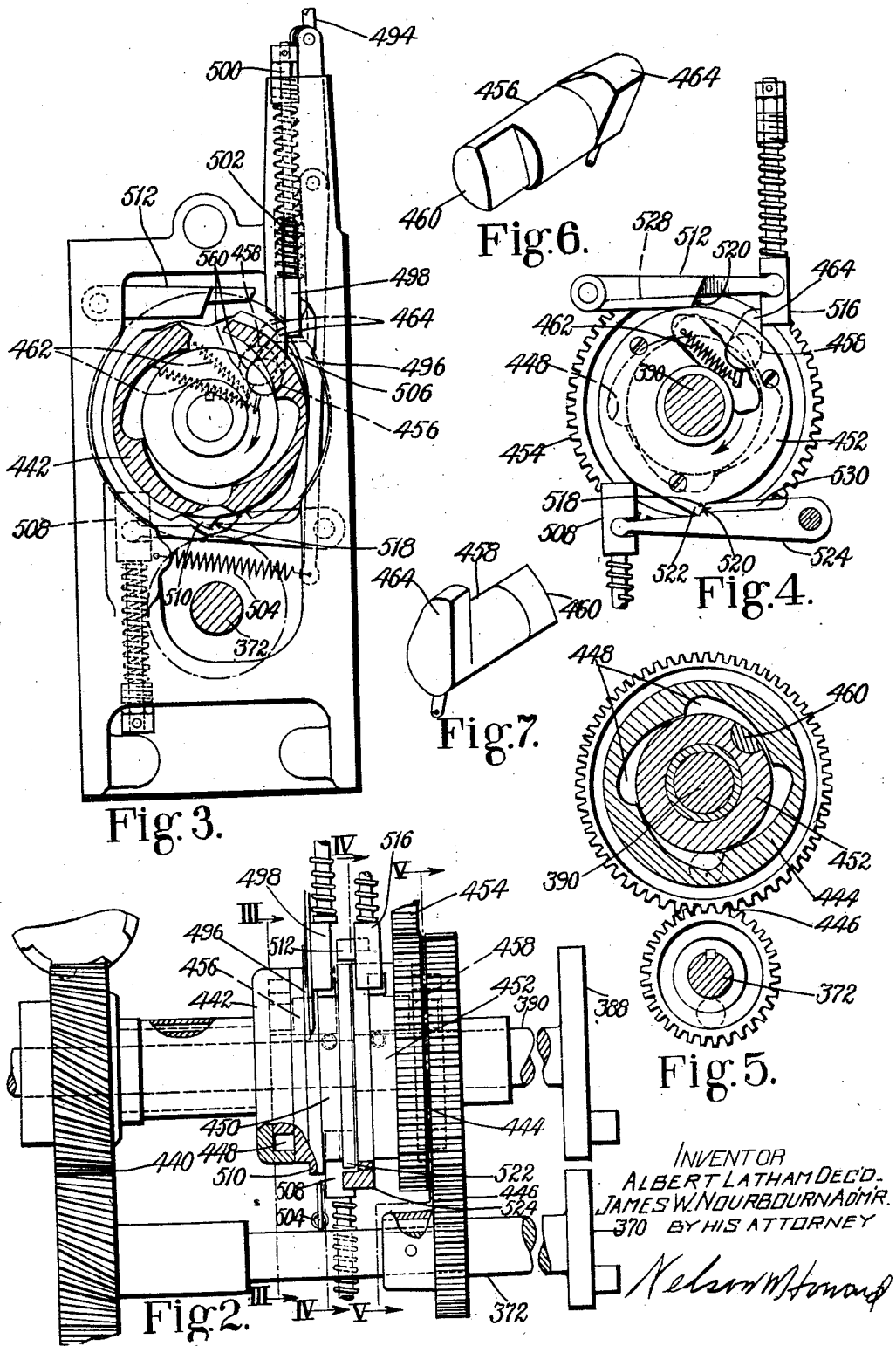

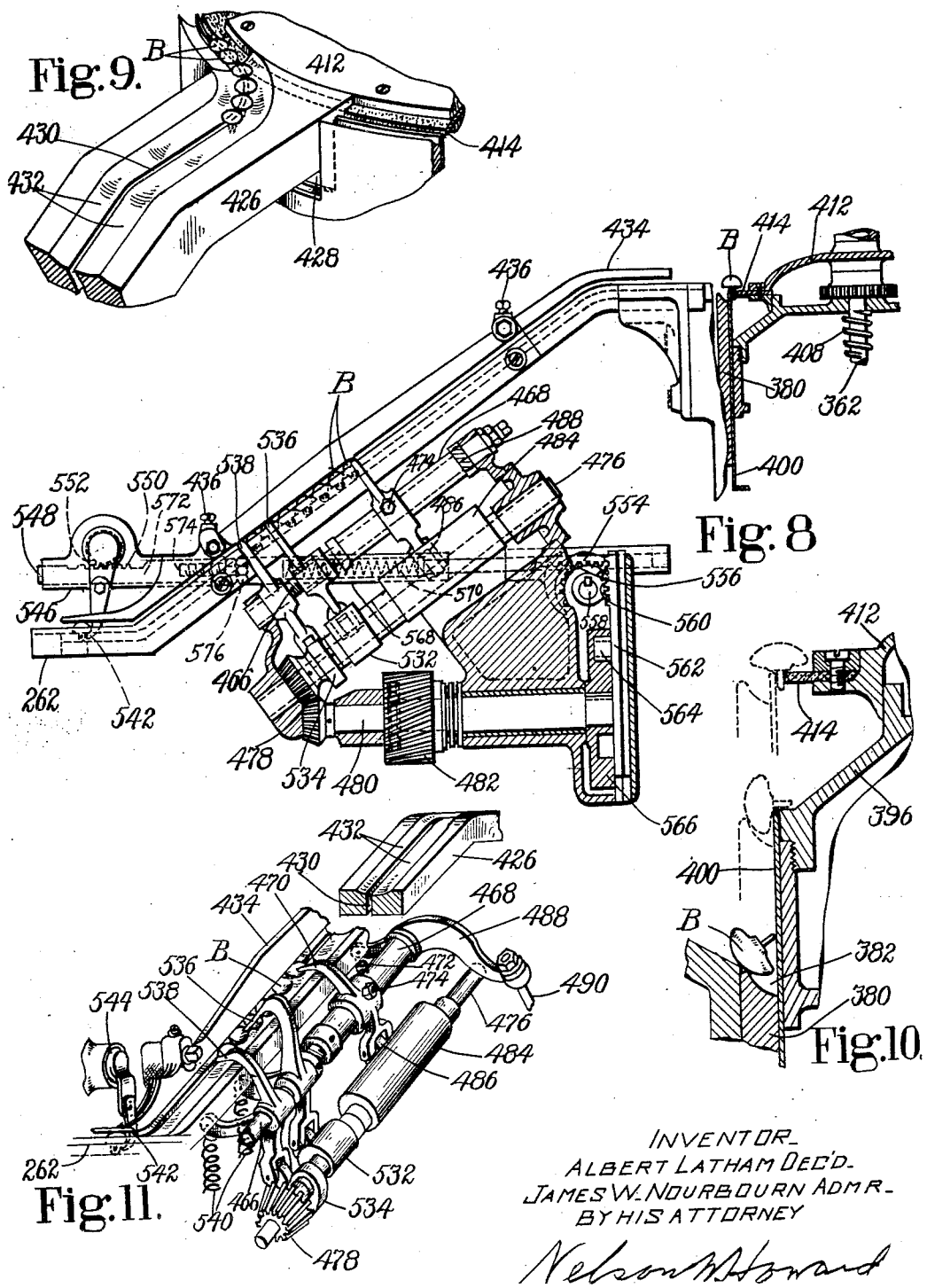

1,845,051

UNITED STATES PATENT OFFICE

ALBERT LATHAM, DECEASED, LATE OF BEVERLY, MASSACHUSETTS, BY JAMES W. NOURBOURN, ADMINISTRATOR, OF SOMERVILLE, MASSACHUSETTS, ASSIGNOR TO AMERICAN BUTTON & FASTENER CO., OF AUGUSTA, MAINE, A CORPORATION OF MAINE

FEEDING MECHANISM

Original application filed November 12, 1921, Serial No. 514,621. Divided and this application filed October 27, 1927. Serial No. 229,187.

This invention relates to mechanisms for feeding articles one by one from a mass, a particular embodiment being illustrated herein and being adapted for thus delivering buttons.

An object of the invention is to effect the delivery of the articles unfailingly and in a predetermined position preliminary to operations which are to be performed upon them. To this end, there are combined in a novel manner with an article-receptacle and a conveyor, as a raceway leading therefrom, a member for engaging articles in the receptacle, a positioning member co-operating with the engaging member, and means for delivering the positioned articles to the conveyor. By this organization, the desired relation of the articles is obtained before they are acted upon by the delivering means, and their orderly advance is assured. Regardless of the positioning action, there is preferably employed, for engaging and elevating the articles for delivery, a cylinder movable in the receptacle. To effect the positioning of the articles upon such an elevating cylinder, a co-operating cylinder may be used. When the articles to be fed are buttons, the elevating member may have a surface arranged to support their heads, while the positioning member co-operates with the button-eyes. The delivering means is shown as an annulus of yieldable material, as rubber, acting over the interior of the positioning cylinder. The elevating member is under the influence of means which first moves it into engagement with the articles, and also of means which moves it to a greater extent for the delivering operation. As herein illustrated, the positioning member and delivering member are also actuated in this last-mentioned movement. The various movements are best effected by a plurality of power mechanisms, as clutches, which exercise reciprocal control. That is, in the present instance, one of these power mechanisms, after being started in operation to actuate the elevating member and positioning member in the final delivering movement, in turn starts power mechanism for the delivering member and stops itself during its cycle, to be again started by the power mechanism for the delivering member for restoration to normal. Both mechanisms stop themselves at the termination of their cycles. To so regulate the mechanisms just indicated, or similar combinations, that they will function only when a supply of articles is needed in the raceway or conveyor and thus avoid the clogging which might result if the delivering member were permitted to force articles into a full raceway, they are placed under the control of said articles, acting only when these decrease below a certain number. This may be accomplished by a member, as a finger movable by the articles in the raceway, there being novel connections between this finger and the clutch or other power mechanism for governing the initiation of its action. In this way, the articles in the raceway may be kept from exceeding a desired number.

In the accompanying drawings,

Fig. 2 is a broken side elevation of the clutch mechanism for controlling the button-feeding cylinders and co-operating annulus;

Figs. 3, 4 and 5 are transverse sections on the lines III—III, IV—IV and V—V, respectively, of Fig. 2;

Figs. 6 and 7 show in perspective the connecting devices for the two portions of the clutch mechanism of Fig. 2;

Fig. 8 is a side elevation of the controlling means for the clutch mechanism, parts being in section;

Fig. 9 illustrates in perspective the upper portion of the button-raceway with the co-operating elevating cylinders;

Figure 1:
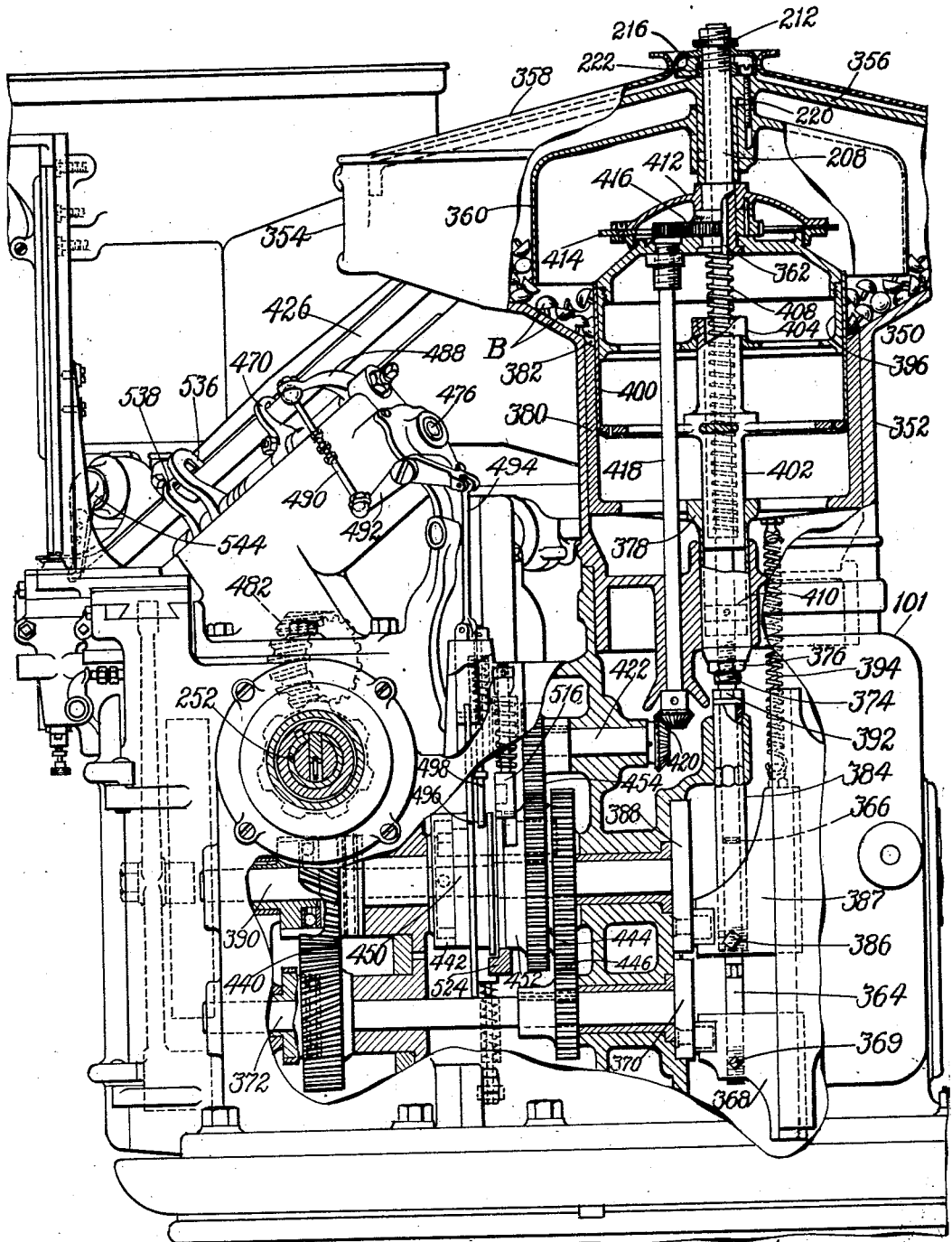
Fig. 1 is a side elevation of one embodiment of the invention, parts being broken away and in section.

Fig. 10 gives in enlarged vertical section three successive positions of the cylinders; and Fig. 11 is a perspective view of the lower portion of the button-raceway and co-operating button-controlling fingers.

Upon a casing-section 101 is mounted a casing 350, having a cylindrical portion 352, at the top of which is carried a receptacle or hopper 354 for buttons B. The top of the hopper 354 is closed by a cover 358 having an axial opening, and which may be centered by an inverted cup 216 formed as a depending skirt from a nut 212. This nut is threaded upon a sleeve 208 fixed in a central opening in the hub of a spider 356 secure on the top of the hopper. To limit the flow of the buttons, preventing them from gathering in too great masses at the points from which they are to be delivered, a cylindrical wall 360 has a central hub surrounding the sleeve 208, it being supported upon a screw 220 turning in the hub of the spider and being threaded into the hub of the wall. By rotating the screw 220, the wall 360 may be raised and lowered, so that the space between its lower edge and the bottom of the hopper may be varied to control the flow of buttons therethrough. The screw may be fixed in its adjusted position by a collar 222 surrounding the sleeve 208 and having a slot in its side to engage and hold the squared head of the screw. This retaining collar is shown as held in place by the nut 212. Extending vertically and axially of the hopper 354 is a spindle 362, bearing in the casing 101 and in the spider-sleeve 208, and resting upon an independent alined spindle-section 364, the two spindle-sections being divided at 366. The lower section 364 is fixed upon a slide 368 by means of a set-screw 369, so that it may be vertically adjusted. The slide is movable in vertical ways in the casing 101, being carried upon the pin of a crank-disk 370 constantly rotated by a horizontal shaft 372 journaled in said casing. The manner in which this and other actuating elements of the button-feeder are moved will later be described. Threaded at 374 upon the spindle-section 362 for vertical adjustment, and being secured by a lock-nut 376, is the depending hub 378 of a cylindrical head-engaging and button-elevating member 380 arranged to slide within the cylindrical portion 352 of the casing. The top of this member 380 is grooved at 382 (Fig. 10), the upper edge being curved downwardly and inwardly and giving a depression into which the button-heads tend to settle from the bottom of the hopper, and there be carried with their eyes inclined upwardly and inwardly.

Surrounding the adjacent portions of the spindle-sections 364 and 362 is a sleeve 384, held by a set-screw 386 to permit vertical adjustment in a slide 387 vertically movable in ways in the casing 101. The slide 387 is reciprocated in its ways by engagement with it of the pin of a crank-disk 388 secured upon a shaft 390 journaled parallel to the shaft 372 of the associated crank-disk 370. The upper end of the sleeve contacts with a collar or enlargement 392 upon the spindle, and thus in the rotation of the crank-disk 388 acts upon the cylinder 380. A spring 394 connects the slide 387 and the supporting head of the cylinder 380, this spring tending to maintain engagement between the sleeve 384 and the enlargement 392 and steadying the cylinder in its movement. The throw of the crank-disk 388 is greater than that of the disk 370, so that when the former is in operation, it will carry the upper spindle-section 362 away from the lower section 364, elevating the cylinder 380 independently of the action of the disk 370, the spindle sections separating at this time at 366. Arranged to slide vertically in an annular opening between the cylinder 380 and a stationary bell 396, the latter being carried upon the sleeve 208, is an eye-engaging and button-positioning cylinder 400. The cylinder 400 is concentric to the cylinder 380 and with the groove 382 therein forms an annular button-receiving depression. It has an elongated hub 402 surrounding the spindle 362, there being at the upper portion an enlargement 404 resting upon the bottom wall or head of the bell 396, which thus limits downward movement of the cylinder 400. Between the upper portion of the bell and the bottom of the hub 402, encircling the spindle within said hub, is a helical spring 408, which assists gravity in holding the cylinder 400 in its normally lowered position, and steadies the movement of this cylinder when it is raised. Fastened about the spindle-section 362 below the end of the hub 402 and between it and the bottom of the hub 378 is a collar 410, which, after a certain upward travel of the spindle, will contact with the lower extremity of the hub 402 to elevate the cylinder 400.

Rotatable about the bottom of the sleeve 208 and being held against downward movement by the top of the bell 396 is a rotatable delivering disk 412, having secured to it a horizontally extending annulus 414, which may consist of a flat ring of rubber. The periphery of this annulus lies above and just within the interior surface of the positioning cylinder 400. Through its supporting disk, it is rotated by spur-gearing 416 from a vertical shaft 418 having a bearing in the bell and in the bottom of the portion 352 of the casing. The shaft 418 is connected by bevel-gearing 420 with a horizontal shaft 422 arranged to turn in the casing 101 and driven from the shaft 372 by gearing which will later be described. As is best shown in Fig. 9 of the drawings, when the cylinders 380, 400 are in their highest positions, the rotation of the annulus 414 acts to deliver the buttons B supported upon the cylinders into the curved end of a downwardly inclined raceway or conveying means 426, which enters an opening 428 in the upper edges of the cylinders. The members 380, 400 and 414 therefore cooperate to supply buttons from the receptacle to the raceway. The lower extremity of the raceway 426 delivers to a point at which the buttons are to be operated upon, as to a table 262 (Fig. 11) at which they are to be assembled with staples. In cross-section, the raceway 426 shows a slot 430 receiving the button-eyes, at each side of which slot are curved grooves 432, 432, upon which the under sides of the button-bodies rest. Supported above the raceway is shown a cover 434, holding the buttons against outward displacement, this preferably being carried upon screws 436, by which it may be vertically adjusted to permit of correct co-operation with buttons of different sizes.

The actuating mechanism for the elevating and positioning cylinders 380 and 400 and the annulus 414 will now be described. This mechanism turns the crank-disk 370 continuously, and, under the control of the buttons in the raceway 426, rotates the crank-disk 388 in two steps of 180 degrees each, and the annulus 414 through preferably a full button-feeding rotation for the first half-rotation of the disk 388. A train 440 of spiral-gearing drives the shaft 372 at the proper speed from an actuating shaft 252 journaled across the casing 101, and at the same time rotates a clutch member 442, turning loosely upon the shaft 390. Associated with this clutch member 442 and also loose upon the shaft 390 is a clutch member 444, rotated through spur-gearing 446 from the shaft 372. Each of the members 442 and 444 has a circular series of internal depressions 448. Between them are respectively co-operating clutch members 450 and 452, the former fixed to the shaft 390 and the latter loose thereon and connected by spur-gearing 454 to the shaft 422. Mounted to turn in the members 450 and 452 are the respective connecting members 456 and 458 (Figs. 6 and 7), each having a detent-portion 460, which is urged by a spring 462 to leave, by its partial rotation, a recess which it occupies to engage one of the depressions 448 and cause the associated clutch members to rotate together. Each detent-portion is normally held out of this driving engagement by contact of a projection 464 of its connecting member with a relatively fixed controlling member, so that the corresponding clutch member 452 or 450 will be at rest.

Mounted in the frame, parallel to the raceway 426, is a spindle 466 (Figs. 8 and 11), about which is arranged to turn a sleeve 468, having fixed upon it a contact-finger 470. This finger, under the influence of a spring 472, is drawn at its end over the raceway into contact with a button therein, or, if the raceway is empty at the point beneath the finger, is carried downward to a greater extent into contact with the raceway itself. The finger 470 may be adjusted longitudinally of the sleeve 468 and clamped by means of a set-screw 474 to adapt it for co-operation with buttons at different points along the raceway, providing for the gathering below it of a greater or less number. Rotatable in brackets rising from the casing 101 and parallel to the spindle 466 is a shaft 476, connected by bevel-gearing 478 with a horizontal shaft 480 rotated by spiral-gearing 482 from the shaft 252. Fixed upon the shaft 476 is a cam 484, contacting with a roll 486 upon an arm projecting from the finger 470 at the opposite side of its carrier-sleeve 468. The sleeve 468 also has fast upon it, near its upper extremity, an arm 488, which is joined by a link 490, preferably adjustable in length and having universal joints, to one arm of a bell-crank lever 492 (Fig. 1) pivoted upon the frame. Joined to the opposite arm of the bell-crank lever is a link 494, having at its lower extremity a hooked engaging member 496 (Fig. 3). When there is a button beneath the finger 470, the connecting elements maintain the hook of the member 496 above the lower end of a stop member 498, which is supported upon a vertical spindle 500 mounted to slide in the frame, and forced normally down by a spring 502 surrounding the spindle. A spring 504, connecting the end of the hooked member and frame, holds the former against the side of the stop member. If the number of buttons in the raceway 426 so diminishes that the uppermost is at a point farther down the raceway than the finger 470, this finger is drawn down by its spring 472, lowering the hooked member 496, so that it passes beneath the end of the stop member 498. Previous to this, the roll 486 was held, by the contact of the finger 470 with a button, out of engagement with the cam 484, except at its portion of maximum diameter, which in its rotation acts sufficiently upon this finger to raise it and allow the downward travel of the buttons along the raceway. Now, however, the roll 486 is fully raised into contact with the periphery of the cam, and this, in its rotation, moves the connections of the hooked member 496 in the opposite direction to that in which they were carried by the action of the spring 472. Consequently, the hooked member is lifted, carrying with it the stop member 498 and compressing the spring 502. This rise of the member 498 releases the projection 464 of the connecting member 456, which has been resting against the side of the stop member, and said connecting member is rotated by its spring 462 until the engaging portion 460 turns into one of the depressions 448 of the constantly rotating clutch member 442. This drives the clutch member 450, by which the connecting member 456 is carried until the projection 464 strikes the sides of an upwardly spring-pressed stop member 508 mounted similarly to the stop member 498. The contact turns the connecting member 456 against the tension of its spring, restoring the engaging portion 460 to its normal position out of the depression 448 and releasing the driven clutch member 450 from the driving member 442, the former thus being stopped after it has rotated through 180 degrees. As soon as the clutch member 450 started in rotation, a cam-projection 506 upon its periphery came into contact with the hooked member 496, releasing it from engagement with the end of the stop member 498 and allowing the spring 502 to return said stop member to its lowered position, the hook of the member 496 again resting against the outer side of the stop member, ready for a succeeding action. As the stopping position of the clutch member 450 is approached, a projection 510 upon it, having turned through nearly a half revolution, comes beneath the under side of a lever 512 pivoted upon the frame and having its opposite end articulated to a spring-pressed stop member 516 arranged similarly to the companion stop members 498 and 508. After the projection 510 has passed beneath and forced up the lever 512, an inclined surface 518 upon it lies beyond, considering the direction of rotation, a surface 520 upon the lever 512, so that reverse movement or rebound of the clutch member 450 is prevented. By this half-rotation of the clutch member 450, the crank-disk 388 has been turned through 180 degrees and stopped. The effect of this will hereinafter be described. When the lever 512 was raised by the projection 510, it lifted the stop member 516 away from the projection 464 of the connecting member 458 mounted in the clutch member 452. The connecting member is thereupon turned by its spring 462, and, similarly to the associated connecting member 456, joins its clutch member 452 to the driving member 444. Rotation of this member 452 results, continuing until it has made a complete turn and the projection 464 again strikes the stop member 516, throwing the connecting member out of engagement and releasing the clutch member 452. Just before the clutch member 452 is stopped by the member 516, a projection 522 on said clutch member contacts with the upper surface of a lever 524, fulcrumed upon the frame and engaging at its opposite end the stop member 508. There are upon this projection and lever respective contact-surfaces 518 and 520 to prevent the rebound of the clutch member 452 similar to that of the member 450. The clutch member 452 having thus been stopped and held, it has, through the intermediate gearing 454, 420, 416 (Fig. 1), turned the annulus 414 through a complete rotation. The downward movement of the stop member 508, under the influence of the lever 524, releases the projection of the connecting member 456, which caused the holding of the clutch member 450 at the end of its half-rotation. The connecting member 456 is consequently again turned by its spring, so that the rotation of the member 450 is effected by the driving member 442 until the projection 464 of the member 456 returns to its initial position, at which it contacts with the stop member 498. This causes the release of the clutch member 450, which has now completed a full turn, bringing the crank-disk 388 to its initial position. The levers 512 and 524 are cut out at 528 and 530 to respectively permit the passage of the projections 522 and 510 without effect upon such levers, which, as has been explained, are moved respectively by the projections 510 and 522.

The effect of the actuating mechanism described above upon the button-elevating and positioning cylinders 380 and 400 and upon the annulus 414 is as follows: The cylinder 380 is constantly reciprocated by the crank-disk 370, the spindle-sections 362 and 364 being in contact at 366. This causes the heads of the buttons B in the hopper 354 to settle into the groove 382 with their eyes resting against the positioning cylinder 400, as may clearly be seen at the lower portion of Fig. 10 and also in Fig. 1. As long as there are buttons in the lower portion of the raceway 426 as far above the delivery-end as the finger 470, so that the latter is held out of contact with the cam 484, the crank-disk 388 remains at rest and the cylinder 400 out of operation. When, however, the buttons have been used from the raceway until the upper one therein passes below the finger, the release of this produces the half-rotation of the crank-disk 388, which has just been described. The movement of the slide 387, under the influence of the crank-disk 388, causes the contact of the end of the sleeve 384 with the enlargement 392 upon the spindle to raise the elevating cylinder 380 to a greater extent than has been effected by the crank-disk 370 of shorter throw, the spindle-sections now separating at 366. The cylinders are consequently related as appears at the center of Fig. 10. At this time, the eyes of the buttons lie in a substantially horizontal plane above the upper end of the positioning cylinder 400. Now the collar 410 upon the spindle strikes the lower extremity of the hub 402 of the positioning cylinder, and the cylinders move up together, as shown at the upper portion of Fig. 10. In this relation the button-eyes have been caught between the inner surface of the cylinder 400 and the outer edge of the annulus 414 and brought to a vertical position. As the cylinders rest, the rotation of the annulus is started under the influence of the clutch member 452, and by the frictional engagement of the yieldable material the buttons are dragged about the cylinder 400 and into the slot 430 of the raceway 426, down which they slide into contact with the buttons which remain therein. It should be noted that the elevating capacity of the cylinder 380 for a single operation preferably does not exceed the holding capacity of the raceway above the finger 470. There is now a button-body beneath the finger, so that when it is released by the cam 484 it is over a button in the raceway, upon which it descends to maintain the member 496 out of lifting engagement with the stop member 498 until the buttons have again lowered in the raceway to a point beyond it. The button-receiving reciprocation of the cylinder 380 is now resumed, and the action of the positioning cylinder and feeding annulus ceases until the supply of buttons in the raceway has passed below the finger 470. By this intermittent delivery, crowding and clogging of buttons in the raceway is entirely avoided, it being evident that difficulties would result were the forcing of the buttons into the slot 430 to constantly continue under the influence of frictional engagement of the annulus 414.

In addition to the cam 484, the shaft 476 carries cams 532 and 534, acting respectively upon upper and lower retaining fingers 536 and 538 co-operating with the buttons in the raceway 426 below the finger 470. The finger 536 turns with the spindle 466, and the finger 538 about said spindle. Springs 540, 540 cause the finger 536 to move, when permitted by its cam, into contact with a button-body, while the finger 538 is carried, when freed by the cam, just in front of the next button below that engaged by the finger 536. The action of the cams 532 and 534 is to alternately raise the fingers and permit them to be lowered, the cam 534 being preferably of the quick-drop type, and the relation between the movements being such that as the lowest button is released by the finger 538, the button above is held by the finger 536, and that thereafter, when the lower finger is down, the upper finger frees its button to take the place of the one just released by the finger 538. The button which leaves the finger 538 slides down the raceway into the path of an oscillatory delivery-finger 542 (Figs. 8 and 11) having a hooked end operating in the slot 430, which serves by its forward movement to positively advance the buttons one by one to the table 262. The finger 542 is secured upon a short shaft 544 journaled in a bracket 546 mounted on the casing 101. This bracket also guides a reciprocatory horizontal rod 548, having formed upon it rack-teeth 550, which mesh with teeth of a gear-segment 552 fast upon the shaft 544. At the opposite end of the rod 548, rack-teeth 554 are formed, engaged by a gear-segment 556 secured upon a horizontal shaft 558. The shaft 558 also carries, fixed upon it, a segment 560, engaged by a rack-bar 562 sliding in vertical ways in the frame and having a roll or projection 564 entering a groove in a cam 566 fast upon the shaft 480. The rod 548 includes relatively movable sections, one 568 being tubular and containing a spring 570 co-operating with the companion section and permitting the rod to yield in event of improper engagement of the finger 542 with the buttons. The section 568 may also be adjustable as to length, having a portion 572 threaded upon a stem 574 projecting from the adjacent section, and fixed in the desired position by a lock-nut 576. By means of this adjustment, the relation of the finger 542 to the button which it is to deliver may be varied.

The present application is a division of that application for improvements in Machines for assembling and mounting articles, filed on November 12, 1921, in the name of James W. Nourbourn, administrator of the estate of Albert Latham, deceased, and bearing the Serial No. 514,621. This application matured into Letters Patent No. 1,681,244 on August 21, 1928.

Having described the invention, what is claimed as new and is desired to be secured by Letters Patent of the United States is:

1. In a machine of the class described, an article-receptacle, a conveyor leading therefrom, an article-engaging member operating in the receptacle, an article-positioning member co-operating with the engaging member, means for first moving one of said members independently of the other and thereafter moving them together, and means for delivering the positioned articles to the conveyor.

2. In a machine of the class described, an article-repectacle, a conveyor leading therefrom, an article-engaging member operating in the receptacle, means for moving the receptacle and engaging member relatively to remove articles from the associated articles in the receptacle, article-positioning means co-operating with the engaging member, means for moving the engaging member independently of the positioning member, means for moving the engaging member and positioning means together, and means for delivering the positioned articles to the conveyor.

3. In a machine of the class described, an article-receptacle, a conveyor leading therefrom, an article-engaging member operating in the receptacle, means for elevating the engaging member to lift articles from the associated articles in the receptacle, an article-positioning member co-operating with the engaging member, said positioning member being held stationary during such lifting action and being thereafter movable, and means for delivering the positioned articles to the conveyor.

4. In a machine of the class described, an article-receptacle, a conveyor leading therefrom, an article-engaging member operating in the receptacle, means for elevating the engaging member to lift articles from the associated articles in the receptacle, an article-positioning member movable in co-operation with the engaging member, an article-delivering member into co-operation with which the positioning member moves, and means for actuating the delivering member.

5. In a machine of the class described, an article-receptacle, a raceway leading therefrom, a cylinder movable in the receptacle to elevate the articles, and means movable in co-operation with the cylinder to deliver articles to the raceway.

6. In a machine of the class described, an article-receptacle, a raceway leading therefrom, a plurality of cylinders movable in the receptacle and co-operating to elevate the articles, and means co-operating with the cylinders to deliver articles to the raceway.

7. In a machine of the class decribed, an article-receptacle, a raceway leading therefrom, a plurality of concentric cylinders movable in proximity to one another and to the receptacle and co-operating to elevate the articles, and means co-operating with the cylinders to deliver articles to the raceway.

8. In a machine of the class described, an article-receptacle, a raceway leading therefrom, a plurality of cylinders movable in the receptacle and co-operating to elevate the articles, means co-operating with the cylinders to deliver articles to the raceway, means for reciprocating the cylinders to elevate the articles, and means co-operating with the cylinders to deliver articles to the raceway.

9. In a machine of the class described, an article-receptacle, a raceway leading therefrom, a plurality of cylinders movable in the receptacle and co-operating to elevate the articles, and rotatable means co-operating with the cylinders to deliver articles to the raceway.

10. In a machine of the class described, an article-receptacle, an article-conveyor leading therefrom, an article-carrying member operating in the receptacle, means for moving the carrying member to elevate articles from those in the receptacle, a reciprocatory article-positioning member co-operating with the carrying member, means effective after the elevating movement of the carrying member has been initiated for initiating movement of the positioning member, and means for delivering the positioned articles to the conveyor.

11. In a machine of the class described, an article-receptacle, an article-conveyor leading therefrom, an article-carrying member operating in the receptacle, an article-positioning member co-operating with the carrying member, and a rotatable delivering member arranged to contact with the positioned articles and co-operating with the conveyor.

12. In a machine of the class described, an article-receptacle, a raceway leading therefrom, a cylinder movable in the receptacle to elevate the articles, and a contact member opposite which the cylinder is moved and which acts to deliver articles to the raceway.

13. In a machine of the class described, an article-receptacle having at its bottom an annular opening, a plurality of concentric cylinders operating in the opening, means arranged to move the cylinders upwardly to the delivering position, and delivering means co-operating with the cylinders at such delivering position.

14. In a machine of the class described, an article-receptacle, a conveyor leading therefrom, an elevating member having an article-receiving depression movable in the receptacle, a member co-operating with the elevating member to change the position of the article in the depression, and means for delivering a positioned article from engagement by the elevating and positioning members to the conveyor.

15. In a machine of the class described, an article-receptacle, a conveyor leading therefrom, an article-engaging member operating in the receptacle, means for moving the receptacle and engaging member relatively to remove articles from the associated articles in the receptacle, an article-positioning member co-operating with the engaging member, and means for delivering the positioned articles to the conveyor, the delivering means being arranged to co-operate with the articles upon the positioning member to position them.

16. In a machine of the class described, an article-receptacle, a conveyor leading therefrom, an article-engaging member operating in the receptacle, means for moving the receptacle and engaging member relatively to remove articles from the associated articles in the receptacle, an article-positioning member co-operating with the engaging member, and means for delivering the positioned articles to the conveyor, the delivering means being arranged to press articles against the positioning means.

17. In a machine of the class described, an article-receptacle, a conveyor leading therefrom, an article-engaging member operating in the receptacle, means for moving the receptacle and engaging member relatively to remove articles from the associated articles in the receptacle, an article-positioning member co-operating with the engaging member, and means for delivering the positioned articles to the conveyor, the delivering means being arranged to contact with the articles to further position them prior to delivery.

18. In a machine of the class described, an article-receptacle, a raceway leading therefrom, a cylinder having its upper edge within the receptacle and provided with a downwardly and inwardly inclined surface, an inner concentric cylinder co-operating with said inclined surface to furnish an annular article-receiving depression, means for moving the cylinders to elevate the articles in the depression from the receptacle, and a member co-operating with the cylinders to deliver the elevated articles to the raceway.

19. In a machine of the class described, an article-receptacle, a raceway leading therefrom, means for elevating articles from the receptacle into proximity with the raceway, and an annulus of yieldable material contacting with the elevated articles to deliver them to the raceway.

20. In a machine of the class described, an article-receptacle, a raceway leading therefrom, means for elevating articles from the receptacle into proximity with the raceway, and a rubber ring contacting with the elevated articles to deliver them to the raceway.

21. In a machine of the class described, an article-receptacle, a raceway leading therefrom, means for elevating articles from the receptacle into proximity with the raceway, an annulus of yieldable material contacting with the elevated articles to deliver them to the raceway, and means for rotating the annulus to deliver said article to the raceway.

22. In a machine of the class described, an article-receptacle, a raceway leading therefrom, a cylinder movable in the receptacle to elevate the articles, and a yieldable annulus co-operating with the cylinder to deliver elevated articles to the raceway.

23. In a machine of the class described, an article-receptacle, a raceway leading therefrom, a cylinder movable in the receptacle to elevate the articles, and a yieldable annulus arranged to contact with the articles to position them upon the cylinder and to deliver them to the raceway.

24. In a machine of the class described, an article-receptacle, a raceway leading therefrom, a cylinder movable in the receptacle to elevate the articles, a yieldable annulus co-operating with the interior of the cylinder, and means for rotating said annulus to deliver articles from the cylinder to the raceway.

25. In a machine of the class described, a button-receptacle, a raceway leading therefrom, an elevating member having a surface arranged to support the button-heads, a member co-operating with the eyes of the elevated buttons to position them, and means for delivering the positioned buttons to the raceway.

26. In a machine of the class described, a button-receptacle, a raceway leading therefrom, an elevating member having a surface arranged to support the button-heads, an elevating member contacting with the button-eyes, means for moving the members to arrange the buttons in a predetermined position on an elevating member, and means for delivering the positioned buttons to the raceway.

27. In a machine of the class described, a button-receptacle, a raceway leading therefrom, an elevating member having a supporting surface, a second elevating member co-operating with said surface to furnish a depression to receive the button-heads, means for moving the members relatively to cause the button-eyes to rest upon the top of the second member, and means contacting with said eyes to raise them from the depression and deliver them to the raceway.

28. In a machine of the class described, a button-receptacle, a raceway leading therefrom, concentric cylinders co-operating to furnish a depression to receive the button-heads, means for moving the cylinders relatively to bring the button-eyes to predetermined positions, an annulus situated within the cylinders for delivering buttons to the raceway, and means for moving the cylinders and annulus relatively to prepare the buttons for delivery.

29. In a machine of the class described, a receptacle arranged to receive a mass of articles, means for conveying articles from the receptacle, normally ineffective means for separating a series of articles from the mass in the receptacle, means for delivering such series of articles from the separating means to the conveying means, and means controlled by the position of the articles to render the separating means effective and to actuate the delivery means.

30. In a machine of the class described, a receptacle arranged to receive a mass of articles, means for conveying articles from the receptacle, means for supplying articles from the receptacle to the conveying means, means controlled by the articles to govern the supplying means, and means arranged to change the normal relation between the governing means and the articles which control it.

31. In a machine of the class described, a receptacle arranged to receive a mass of articles, means for conveying articles from the receptacle to the conveying means, means controlled by the articles to govern the supplying means, and means arranged to change the position of the governing means and thereby alter the number of articles which cause the actuation of said governing means.

32. In a machine of the class described, an article-receptacle, means for conveying articles from the receptacle, means for supplying articles from the receptacle to the conveyor, means for governing the supply of articles to the conveyor, said governing means including a member initially controlled in its movement by the articles, and power mechanism into co-operation with which the member is moved for the completion of the governing operation.

33. In a machine of the class described, a hopper for articles, a raceway delivering therefrom, mechanism for supplying articles from the hopper to the raceway, actuating mechanism for the supplying mechanism, a governing member controlled by the articles, power mechanism into co-operation with which the governing member is moved, and connections between said member and the actuating mechanism.

34. In a machine of the class described, a hopper for articles, a raceway delivering therefrom, means for elevating articles from the hopper into co-operation with the raceway, means movable to deliver articles from the elevating means to the raceway, actuating mechanism for the elevating means and delivery means, a governing member controlled by the articles, and connections between said member and the actuating mechanism.

35. In a machine of the class described, a hopper for articles, a raceway delivering therefrom, a reciprocatory member arranged to elevate articles from the hopper, a rotatable member arranged to contact with the articles thus elevated and force them into the raceway, driving means for the reciprocatory member and the rotatable member, a governing member controlled by the articles, and connections between said member and the driving means.

36. In a machine of the class described, a hopper for articles, a raceway delivering therefrom, means for elevating articles from the hopper into co-operation with the raceway, a rotatable member contacting with the articles upon the elevating member to feed them into the raceway, actuating mechanism for the elevating member and feeding member, a finger contacting with the articles in the raceway, and connections between said finger and the actuating mechanism.

37. In a machine of the class described, a hopper for articles, a raceway delivering therefrom, mechanism for supplying articles from the hopper to the raceway, clutch mechanism for actuating the supplying mechanism, a finger movable toward and from the articles in the raceway, said finger being arranged for adjustment along the raceway, and connections between the finger and clutch mechanism.

38. In a machine of the class described, a hopper for articles, a raceway delivering therefrom, mechanism for elevating articles from the hopper, a rotatable member co-operating with the elevating mechanism to feed said articles to the raceway, clutch mechanism for actuating the elevating mechanism and feeding member, a finger movable toward and from the articles in the raceway, cam mechanism acting upon the finger, and connections between the finger and clutch mechanism.

39. In a machine of the class described, a button-hopper, a raceway delivering from the hopper and having a slot to receive the button-eyes, means for supplying buttons from the hopper to the raceway, the capacity of the supplying means having a definite relation to the capacity of the raceway, means for controlling the movement of the buttons from the raceway, and a member co-operating with the heads of the buttons in the raceway and arranged to govern the supplying means.

40. In a machine of the class described, a button-hopper, a raceway delivering from the hopper, means for supplying buttons from the hopper to the raceway, actuating mechanism therefor, means situated near the lower portion of the raceway for controlling the movement of the buttons from the raceway, a member mounted adjacent to the raceway at a point higher than the controlling means for contact with the buttons in said raceway, connections between the member and actuating mechanism, and rotatable means arranged to move both the controlling means and contact member.

41. In a machine of the class described, a button-hopper, a raceway delivering from the hopper, means for supplying buttons from the hopper to the raceway, means for controlling the movement of buttons from the raceway, a governing finger for the supplying means pivoted adjacent to the raceway arranged to contact with the buttons therein at a point higher than the controlling means, and a mounting for the finger constructed to permit it to be adjusted toward and from the controlling means.

42. In a machine of the class described, an article-receptacle, an engaging member operating therein, means for moving the engaging member to effect its engagement with articles in the receptacle, means for moving the engaging member to a greater extent to bring the engaged articles to a delivery position, and delivering means co-operating with the thus positioned articles.

43. In a machine of the class described, an article-receptacle, an engaging member operating therein, means for moving the engaging member to effect its engagement with articles in the receptacle, means controlled by the delivered articles for moving the engaging member to a greater extent to bring the engaged articles to a delivery position, and delivering means co-operating with the thus positioned articles.

44. In a machine of the class described, an article-receptacle, an engaging member operating therein and having an article-receiving depression, means for moving the engaging member to introduce articles into the depression, means for moving the engaging member to bring the engaged articles to a delivery position, and delivering means co-operating with the thus positioned articles.

45. In a machine of the class described, an article-receiving member, an article-engaging member operating therein, means for actuating one of the members, and a second means for actuating said member to a greater extent than the first-mentioned actuating means, the second actuating means acting independently of the first.

46. In a machine of the class described, an article-receptacle, a plurality of movable article-engaging members operating therein, means for actuating one of the members, and a second means acting independently of the first actuating means for actuating said member, one of said actuating means being arranged to move another article-engaging member.

47. In a machine of the class described, an article-receptacle, a plurality of movable article-engaging members operating therein, means for actuating one of the members, and a second means for actuating said member, one of said actuating means being arranged to move another article-engaging member after it has imparted a predetermined travel to the first-mentioned member.

48. In a machine of the class described, an article-receptacle, a plurality of movable article-engaging members operating therein, means for reciprocating one of the members, and means for reciprocating said member to a greater extent out of co-operation with the first-mentioned reciprocating means.

49. In a machine of the class described, an article-receptacle, a plurality of movable article-engaging members operating therein, means for reciprocating one of the members, and means for reciprocating said member to a greater extent out of co-operation with the first-mentioned reciprocating means and co-operating with another engaging member to actuate it.

50. In a machine of the class described, an article-receptacle, a plurality of movable article-engaging members operating therein, means for actuating one of the members, a second means for actuating said member, one of said actuating means being arranged to move another article-engaging member, and article-delivering means into co-operation with which one of the engaging members is thus moved.

51. In a machine of the class described, an article-receptacle, a plurality of movable article-engaging members operating therein, means for reciprocating one of the members, means for reciprocating said member to a greater extent out of co-operation with the first-mentioned reciprocating means and for also reciprocating an associated engaging member, and article-delivering means into co-operation with which the engaging members are carried by this greater movement.

52. In a machine of the class described, an article-receptacle, a plurality of movable article-engaging members operating therein, means for actuating one of the members, a second means for actuating said member, one of said actuating means being arranged to move another article-engaging member, article-delivering means into co-operation with which the engaging members are thus moved, and means arranged to actuate the article-delivering means only when such co-operation is brought about.

53. In a machine of the class described, an article-receptacle, an article-delivering member operating therein, a cylinder movable in the receptacle, means for moving the cylinder to effect its engagement with the articles, and means thereafter acting to move the cylinder into co-operation with the delivering member.

54. In a machine of the class described, an article-receptacle, an article-delivering member operating therein, an article-carrying member movable in the receptacle, means for moving the carrying member to effect its engagement with the articles, and means controlled by the articles for moving the carrying member into co-operation with the delivering member.

55. In a machine of the class described, an article-receptacle, an article-delivering member operating therein, an article-carrying member movable in the receptacle, means for moving the carrying member to effect its engagement with the articles, means movable to change the position of the articles on the carrying member, and means for moving the delivering member to cause the delivery of the positioned articles.

56. In a machine of the class described, an article-receptacle, an article-delivering member operating therein, an article-carrying member movable in the receptacle, means for moving the carrying member to effect its engagement with the articles, means to position the articles on the carrying member, and means controlled by the articles for moving the delivering member to cause the delivery of the positioned articles.

57. In a machine of the class described, an article-receptacle, an article-delivering member operating therein, an article-carrying member movable in the receptacle, means for reciprocating the carrying member to effect its engagement with the articles, and means thereafter acting to move the carrying member through a greater distance than its article-engaging reciprocation to cause its co-operation with delivering member.

58. In a machine of the class described, an article-receptacle, an article-delivering member operating therein, an article-carrying member movable in the receptacle, means for reciprocating the carrying member to effect its engagement with the articles, and means controlled by the delivered articles for moving the carrying member through a greater distance than its article-engaging reciprocation to cause its co-operation with the delivering member.

59. In a machine of the class described, an article-receptacle, an article-delivering member operating therein, an article-carrying member movable in the receptacle, means for moving the carrying member to effect its engagement with the articles, means co-operating with the carrying member to position the articles thereon, and means effective only during such co-operation for moving the delivering member to cause the delivery of the articles.

60. In a machine of the class described, an article-receptacle, an article-delivering member operating therein, associated article-engaging members, and means for moving one only of the members to cause its engagement with the articles and to bring the engaged articles into predetermined relation with the associated member, said associated member being thereafter movable with its companion member into co-operation with the delivering member.

61. In a machine of the class described, an article-receptacle, an article-delivering member operating therein, associated article-engaging members, means for moving one of the members to cause its engagement with the articles and to bring the engaged articles into predetermined relation with the associated member, said associated member being movable with its companion member into co-operation with the delivering member, and means effective only during such co-operation for moving the delivering member to cause the delivery of the articles.

62. In a machine of the class described, an article-receptacle, an article-delivering member operating therein, associated article-engaging members, means for moving one of the members to cause its engagement with the articles and to bring the engaged articles into predetermined relation with the associated member, said associated member being movable with its companion member into co-operation with the delivering member, and means controlled by the delivered articles for moving the delivering member to cause the delivery of the articles.

63. In a machine of the class described, an article-receptacle, an article-delivering member, a member for elevating articles from the receptacle to the delivering member, and a plurality of independent actuating devices for the elevating member.

64. In a machine of the class described, an article-receptacle, an article-delivering member, a member for elevating articles from the receptacle to the delivering member, a plurality of independent actuating devices for the elevating member, and an article-positioning member co-operating with the elevating member and being movable with the elevating member under the influence of one of the actuating devices.

65. In a machine of the class described, an article-receptacle, an article-delivering member, a member for elevating articles from the receptacle to the delivering member, a support for the elevating member having independently movable sections, and actuating devices co-operating with different sections.

66. In a machine of the class described, an article-receptacle, an article-delivering member, a member for elevating articles from the receptacle to the delivering member, a support for the elevating member having independently movable sections, actuating devices co-operating with different sections, and means arranged to vary the position of the supporting sections on the actuating devices.

67. In a machine of the class described, an article-receptacle, an article-delivering member, a member for elevating articles from the receptacle to the delivering member, a spindle upon which the elevating member is mounted, a sleeve surrounding and arranged to support the spindle, slides connected to the spindle and sleeve respectively, and means for moving the slides independently.

68. In a machine of the class described, an article-receptacle, an article-delivering member, a member for elevating articles from the receptacle to the delivering member, a spindle upon which the elevating member is mounted, a sleeve surrounding and arranged to support the spindle, slides connected to the spindle and sleeve respectively, means arranged to permit the position of the spindle and sleeve upon the slides to be varied, and means for moving the slides independently.

69. In a machine of the class described, an article-receptacle, an article-delivering member, a member for elevating articles from the receptacle to the delivering member, actuating means for the elevating member, and an article-positioning member co-operating with the elevating member, there being a portion of the actuating means movable into co-operation with the positioning means to cause its actuation.

70. In a machine of the class described, an article-receptacle, an article-delivering member, a member for elevating articles from the receptacle to the delivering member, an article-positioning member co-operating with the elevating member, a support for the elevating member, and an actuating device for the support, the support having a contact portion movable into co-operation with the positioning member to actuate it.

71. In a machine of the class described, an article-receptacle, an article-delivering member, a member for elevating articles from the receptacle to the delivering member, a spindle upon which the elevating member is mounted, a sleeve surrounding and arranged to support the spindle, slides connected to the spindle and sleeve respectively, means for moving the slides independently, and an article-positioning member co-operating with the elevating member, the spindle having a collar movable into engagement with the positioning member.

72. In a machine of the class described, an article-receptacle, article-engaging means operating therein, a plurality of power mechanisms for actuating the engaging means, one of said power mechanisms being provided with means for governing another.

73. In a machine of the class described, an article-receptacle, article-engaging means operating therein, and a plurality of power mechanisms for actuating the engaging means, said power mechanisms being arranged to exercise reciprocal control.

74. In a machine of the class described, an article-receptacle, article-engaging means operating therein, a plurality of power mechanisms for actuating the engaging means, and means controlled by an article for governing the power mechanism, one of said power mechanisms being provided with means for governing the other.

75. In a machine of the class described, an article-receptacle, article-engaging means operating therein, and a plurality of power mechanisms for actuating the engaging means, one of said power mechanisms being provided with means for starting the operation of another.

76. In a machine of the class described, an article-receptacle, article-engaging means operating therein, and a plurality of power mechanisms for actuating the engaging means, one of said power mechanisms being provided with means for starting the operation of another and for stopping its own operation.

77. In a machine of the class described, an article-receptacle, article-engaging means operating therein, and a plurality of power mechanisms for actuating the engaging means, one of said power mechanisms being provided with means for starting the operation of another, the thus governed mechanism having means for stopping its own operation.

78. In a machine of the class described, an article-receptacle, article-engaging means operating therein, and a plurality of power mechanisms for actuating the engaging means, one of said power mechanisms being provided with means for starting the operation of another, the thus governed mechanism having means for starting the governing mechanism.

79. In a machine of the class described, an article-receptacle, article-engaging means operating therein, and a plurality of power mechanisms for actuating the engaging means, one of said power mechanisms being provided with means for starting the operation of another, the thus governed mechanism having means for stopping its own operation and starting the governing mechanism.

80. In a machine of the class described, an article-receptacle, article-engaging means operating therein, a plurality of power mechanisms for actuating the engaging means, and means controlled by an article for starting the operation of a power mechanism, said started mechanism being provided with means for starting the operation of another.

81. In a machine of the class described, an article-receptacle, article-engaging means operating therein, a plurality of power mechanisms for actuating the engaging means, and means controlled by an article for starting the operation of a power mechanism, said started mechanism being provided with means for starting the operation of another and for stopping its own operation.

82. In a machine of the class described, an article-receptacle, an article-delivering member operating therein, an article-elevating member for supplying the delivering member, and power mechanisms for respectively actuating the delivering member and elevating member, each of said power mechanisms being provided with means for governing the other.

83. In a machine of the class described, an article-receptacle, an article-delivering member operating therein, an article-elevating member for supplying the delivering member, and power mechanisms for respectively actuating the delivering member and elevating member, the power mechanism for the elevating member being provided with means for starting the power mechanism of the delivering member.

84. In a machine of the class described, an article-receptacle, an article-delivering member operating therein, an article-elevating member for supplying the delivering member, power mechanisms for respectively actuating the delivering member and elevating member, and means controlled by a delivered article for starting the power mechanism of the elevating member, said power mechanism being provided with means for starting the power mechanism of the delivering member.

85. In a machine of the class described, an article-receptacle, an article-delivering member operating therein, an article-elevating member for supplying the delivering member, power mechanisms for respectively actuating the delivering member and elevating member, and means controlled by a delivered article for starting the power mechanism of the elevating member, said power mechanism being provided with means for starting the power mechanism of the delivering member and for stopping its own operation.

86. In a machine of the class described, an article-receptacle, an article-delivering member operating therein, an article-elevating member for supplying the delivering member, power mechanisms for respectively actuating the delivering member and elevating member, and means controlled by a delivered article for starting the power mechanism of the elevating member, said power mechanism being provided with means for starting the power mechanism of the delivering member and for stopping its own operation and said power mechanism of the delivering member having means for again starting the power mechanism of the elevating member.

87. In a machine of the class described, an article-receptacle, an article-delivering member operating therein, an article-elevating member for supplying the delivering member, power mechanisms for respectively actuating the delivering member and elevating member, and means controlled by a delivered article for starting the power mechanism of the elevating member, said power mechanism being provided with means for starting the power mechanism of the delivering member and for stopping its own operation and said power mechanism of the delivering member having means for again starting the power mechanism of the elevating member and for stopping its own operation.

88. In a machine of the class described, an article-receptacle, an article-delivering member operating therein, an article-elevating member for supplying the delivering member, power mechanisms for respectively actuating the delivering member and elevating member, and means controlled by a delivered article for starting the power mechanism of the elevating member, said power mechanism being provided with means for starting the power mechanism of the delivering member and for stopping its own operation at the completion of the elevating movement.

89. In a machine of the class described, an article-receptacle, two article-engaging members operating therein, power means, and clutches for connecting said engaging members to the power means, one of said clutches having means for causing a movement of the other.

90. In a machine of the class described, an article-receptacle, two article-engaging members operating therein, power means, and clutches for connecting said engaging members to the power means, one of said clutches having means for causing the engagement of the other and its own disengagement.

91. In a machine of the class described, an article-receptacle, two article-engaging members operating therein, power means and clutches for connecting said engaging members to the power means, each of said clutches having means for causing the engagement of the other and its own disengagement.

92. In a machine of the class described, an article-receptacle, two article-engaging members operating therein, power means, clutches for connecting said engaging members to the power means, and means controlled by an article for causing the engagement of one of the clutches, the thus engaged clutch being provided with means for causing the engagement of the associated clutch.

93. In a machine of the class described, an article-receptacle, two article-engaging members operating therein, power means, clutches for connecting said engaging members to the power means, and means controlled by an article for causing the engagement of one of the clutches, the thus engaged clutch being provided with means for causing the engagement of the associated clutch and each of said clutches having means for causing its own disengagement.

94. In a machine of the class described, an article-receptacle, an article-delivering member operating therein, a member for elevating articles from the receptacle to the delivering member, power means, clutches for respectively connecting the delivering member and elevating member to the power means, and means controlled by a delivered article for causing the engagement of the clutch for the elevating means, said clutch being provided with means for causing the engagement of the clutch for the article-delivering means.

95. In a machine of the class described, an article-receptacle, an article-delivering member operating therein, a member for elevating articles from the receptacle to the delivering member, power means, clutches for respectively connecting the delivering member and elevating member to the power means, and means controlled by a delivered article for causing the engagement of the clutch for the elevating means, said clutch being provided with means for causing the engagement of the clutch for the article-delivering means and for causing its own disengagement after partial rotation.

96. In a machine of the class described, an article-receptacle, an article-delivering member operating therein, a member for elevating articles from the receptacle to the delivering member, power means, clutches for respectively connecting the delivering member and elevating member to the power means, and means controlled by a delivered article for causing the engagement of the clutch for the elevating means, said clutch being provided with means for causing the engagement of the clutch for the article-delivering means and for causing its own disengagement after partial rotation and the clutch of the delivering member having means for causing the engagement of the clutch for the elevating member and its own disengagement after a full rotation.

In testimony whereof I have signed my name to this specification.

JAMES W. NOURBOURN,
*Administrator of the Estate of Albert Latham, Deceased.*